United States Patent [19]

Fuerst et al.

[11] Patent Number: 4,630,860
[45] Date of Patent: Dec. 23, 1986

[54] VEHICLE ROOF COVER AND WIND DEFLECTOR

[75] Inventors: Arpad Fuerst, Munich; Alfons Lutz, Emmering, both of Fed. Rep. of Germany

[73] Assignee: Webasto-Werk W. Baier GmbH & Co, Fed. Rep. of Germany

[21] Appl. No.: 753,571

[22] Filed: Jul. 10, 1985

[51] Int. Cl.4 .......................... B60J 7/22; B60J 7/04; B60J 7/047

[52] U.S. Cl. .................................. 296/217; 296/216; 296/220

[58] Field of Search ................ 296/216, 217, 221–224, 296/220; 98/2.14

[56] References Cited

FOREIGN PATENT DOCUMENTS

| 1779679 | 12/1957 | Fed. Rep. of Germany | 296/217 |
| 1946161 | 3/1971 | Fed. Rep. of Germany | 296/222 |
| 3012538 | 10/1981 | Fed. Rep. of Germany | |
| 3311452 | 10/1983 | Fed. Rep. of Germany | |
| 3238454 | 4/1984 | Fed. Rep. of Germany | |
| 382781 | 11/1932 | United Kingdom | 296/217 |

Primary Examiner—Robert B. Reeves
Assistant Examiner—Dennis H. Pedder
Attorney, Agent, or Firm—Sixbey, Friedman & Leedom

[57] ABSTRACT

A vehicle roof having a cover which, in a closed position, closes an opening in the roof and is rearwardly slidable along guide rails from the closed position toward the rear into an open position and provided with a wind deflector which is raised and lowered automatically as a function of the position of the cover. The wind deflector forms a part of the roofing located in front of the cover and is pivotable about an axis extending transversely relative to the sliding direction of the cover. The cover can be tilted out into a ventilating position in which it forms a continuous extension of the wind deflector, which is at least partially raised in conjunction with the tilting of the cover.

20 Claims, 3 Drawing Figures

VEHICLE ROOF COVER AND WIND DEFLECTOR

BACKGROUND AND SUMMARY OF THE INVENTION

This invention relates to a vehicle roof having a cover which, in a closed position, closes an opening in the roof and which is rearwardly slidable from the closed position to an open position along guide rails that extend along both sides of the opening in the roof toward the rear, as well as having a wind deflector that can be raised automatically as a function of the sliding movement of the cover, said wind deflector forming a part of the roofing located in front of the cover and being pivotable around an axis extending transversely to the sliding direction of the cover.

In the case of a known vehicle roof of this type (German Offenlegungsschrift No. 30 12 538) the roof can be slid toward the rear under the fixed part of the vehicle roof. A tilting-out of the sliding cover is not possible. In addition, vehicle roofs are known that have a cover that can be tilted out into a ventilating position and can either be pushed over the fixed part of the roof (German Offenlegungsschrift No. 33 11 452) or under the fixed part of the roof (German Offenlegungsschrift No. 32 38 454 corresponding to commonly assigned U.S. Application Ser. No. 530,776, filed Sept. 9, 1983, U.S. Pat. No. 4,566,730) toward the rear.

The invention, therefore, has a primary objective of providing a vehicle roof of the initially mentioned type, where, as known per se, the cover can be used as a ventilation flap, but without causing disturbing whirls behind the raised wind deflector.

According to a preferred embodiment of the invention, this objective is achieved by the fact that the cover can be tilted out into a ventilation position in which it forms a continuous extension of the wind deflector, which is at least partially raised.

The wind deflector and the cover can, therefore, jointly represent a continuous ventilation flap. In the ventilation position, air whirls are prevented at the rear edge of the wind deflector. In contrast to the known sliding/lifting roofs having a wind deflector which, in the closed position of the cover, is located under the cover, the wind deflector, in the closed position of the cover, is used as part of the roofing. As a result, the cover, itself, may be constructed to be correspondingly shorter and lighter.

For adjusting the position of the cover, preferably two transport carriages are provided which are slidable along guide rails and are connected with the cover via connecting-link guides which, by a limited shifting of the transport carriages in a longitudinal direction of the guide rails with respect to the cover, force the tilting-out of the cover. This results in an especially robust construction when, in a further development of the invention, each of the connecting-link guides has two link slots that are displaced with respect to one another in the longitudinal direction of the guide rails and two link pins, each of which engages in one of the link slots. In order to achieve a perfect alignment of the cover with the at least partially raised wind deflector, the link slots, in this case, are sloped in such a way that the cover, during the tilting-out, carries out a pivotal movement around an (imagined) transverse axis which corresponds to the pivotal axis of the wind deflector and, advantageously, essentially coincides with the front edge of the wind deflector.

For raising the wind deflector, two carriages may also be provided which are slidable along the guide rails and are connected with the wind deflector via link guiding means which force the wind deflector upwardly by the limited shifting of the carriages in the longitudinal direction of the guide rails with respect to the wind deflector. In this case, the carriages are advantageously, for a limited follow-up movement following the transport carriages, resiliently biased toward the rear and are shifted toward the front by the transport carriages. This has the advantage that no separate drive is required for the carriage serving for the adjustment of the wind deflector.

Preferably, in the locations between the cover closing position and the ventilating position, in which the cover forms an extension of the wind deflector, the wind deflector, with its rear area, acts as a hold-down device for the front end of the cover. This results in an especially stiff ventilation flap.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
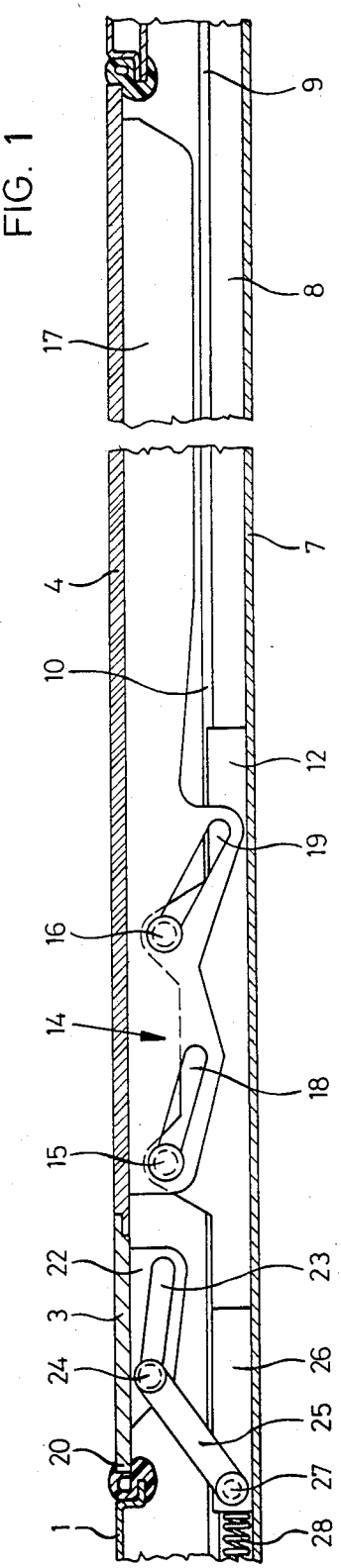
FIG. 1 is a diagrammatic longitudinal section through a vehicle roof according to the invention when the cover is in the closed position.
Figure 2:
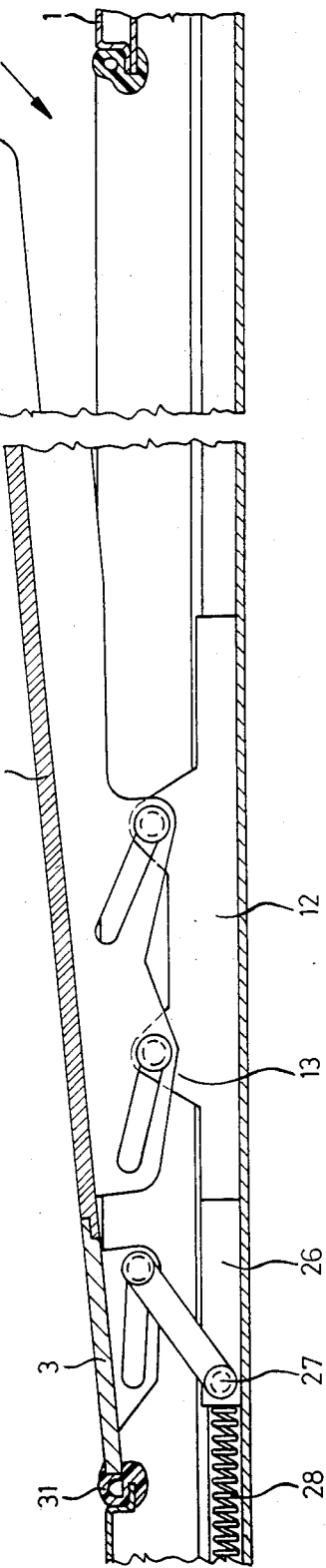
FIG. 2 is a section corresponding to FIG. 1, where the wind deflector and the cover form a continuous ventilation flap.

In the figures, a fixed part of the vehicle roof 1 has a rectangular opening 2. The opening 2 in the roof 1 can be closed by means of a wind deflector 3 and a cover 4 (FIG. 1). As shown in FIG. 2, the cover 4 can be tilted out into a ventilating position in which it forms a continuous extension of the partially raised wind deflector 3. This means that the wind deflector and the cover, in this operating position, represent a continuous ventilating flap which permits a ventilating of the interior of the vehicle via a slot 5 created between the rear edge of the cover and the rear edge of the opening 2 in the roof 1. From the position shown in FIG. 2, the cover 4 can be pushed further toward the rear in order to partially expose the opening 2 in the roof at an area between the wind deflector 3 and the cover 4. The wind deflector 3 is fully raised when the cover is moved to the FIG. 3 position.

A guide rail 7, extending in the longitudinal direction of the vehicle, is located at both sides of the opening 2. Each guide rail 7 extends from a point located close to the front edge of the opening 2, toward the rear, to an area under the fixed part 1 of the roof. The guide rails 7 located at both sides of the opening, in a manner that is not shown in detail, may be part of a frame. Of the guide rails 7, only the guide rail that is on the left, when viewed from the front of the vehicle, is shown in the figures. The opposite right guide rail and the interacting functional parts of the roof are developed mirror-symmetrically with respect to the arrangement on the left side of the vehicle.

The guide rails 7 forms a guide channel 8 that is rectangular in its cross section, a longitudinal slot 10 (FIG. 1) being formed in the top wall 9 of the guide channel 8. Along the guide rail 7, a transport carriage 12 is slidably guided. The transport carriage 12 may, advantageously, be moved via pressure-resistant threaded cable which is in driving connection with a drive, such as an electric motor or a crank. In this case, the arrangement may be as disclosed in detail in commonly assigned U.S. application Ser. No. 707,762, filed Mar. 4, 1985. An upwardly projecting link pin carrier 13 is disposed on the transport carriage 12 and forms part of a link guide that, as a whole, has the reference number 14. A link pin 15 is carried at the upper front end of transport carriage 12 and another link pin 16 is carried at the upper rear end of the transport carriage 12.

The cover, at each side, is supported on a cover carrier 17. The cover carriers 17 may be part of a frame or an inside plate of the cover. However, these carriers may also be separate rail-type components. In the front area of the cover carrier 17, two link slots 18, 19 are formed that are staggered with respect to one another in the longitudinal direction of the guide rail 7, a respective one of the link pins 15, 16 of the transport carriage 12 engaging in said link slots 18, 19. The two link slots 18, 19 slope downwardly toward the rear at different angles toward the rear in such a way that, when the transport carriage 12 is displaced along the guide rail 7 between positions that correspond to FIGS. 1 and 2, the cover 4 is caused to carry out a pivotal movement around an (imaginary) transverse axis which corresponds to the pivotal axis of the wind deflector and, preferably, essentially coincides with the front edge 20 of the wind deflector 3.

The wind deflector 3, at each side, is connected with a wind deflector carrier 22 in which a link slot 23 is formed that is also downwardly sloped toward the rear. A link pin 24 engages in each link slot 23, said link pin 24 being disposed at one end of a raising lever 25. The other end of the raising lever 25 is coupled to a carriage 26 by a pin 27. The carriage 26 is slidably guided along the guide rail 7. A biasing spring 28 acts on the front end of the carriage 26 (on the left in the figures), said biasing spring 28 acting to push the carriage 26 so that its rear end abuts against the front end of the transport carriage 12.

When the transport carriages 12, located at both sides of the opening 2 in the roof, are moved rearwardly along guide rails 7 from the closed position (i.e., to the right in FIG. 1) by means of the driving means (not shown), the carriages 26 follow along in this movement under the influence of the respectively associated biasing spring 28. The carriages 12, 26 remain in mutual engagement up to and including the point where the ventilating position shown in FIG. 2 is reached. In the course of this movement of the carriages, the link pins 15, 16 and 24 move in the respective link slots 18, 19 and 23 from the front position (FIG. 1) to the rear end position (FIG. 2). The link slots 18, 19 and 23 are sloped in such a way that, because of this movement of the link pins, the cover 4 and the wind deflector 3 jointly carry out a pivotal movement around the same transverse axis of rotation which, advantageously, is located at the front edge 20 of the wind deflector 21. The cover 4 and the wind deflector 3, therefore, form a smoothly continuous surface over which the wind can sweep without causing whirls at the rear edge of deflector 3 not only in the closed position, but also in the ventilating position and all intermediate positions located between these two positions.

Of course, since the carriages 12, 26 are in the noted mutual engagement, the wind deflector carriages are directly shiftable back toward the front by the transport carriages.

Figure 3:
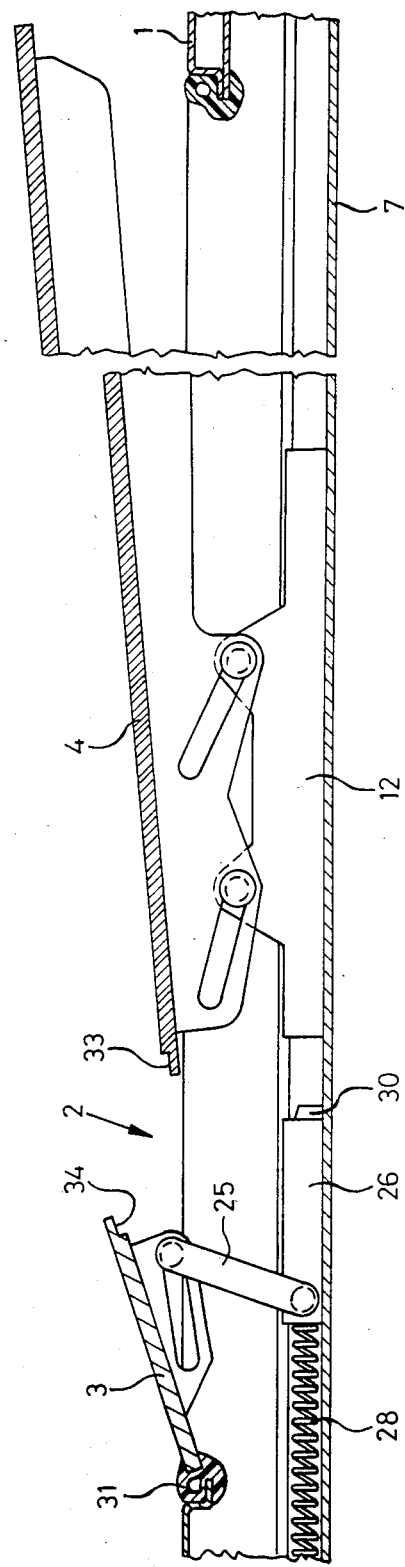
FIG. 3 is a section corresponding to FIGS. 1 and 2 when the cover is partially pushed back and the wind deflector is fully raised.

When the transport carriages 12 are moved toward the rear from the ventilating position shown in FIG. 2, the link pins 15, 16, stopped by the rear ends of the link slots 18, 19, take along the tilted-out cover 4 toward the rear, as is indicated for an intermediate position in FIG. 3. The cover 4 moves toward the rear over the fixed part 1 of the roof. The opening 2 in the roof is exposed to a larger or smaller extent between the rear edge of wind deflector 3 and the front edge of cover 4. The carriages 26 follow the movement of the transport carriage 12 toward the rear under the influence of the respective biasing spring 28 until they meet at stop 30. In the course of this movement of the carriages 26, the raising levers 25 carry out a pivotal movement counterclockwise around their connecting pin 27, however, as can be seen from the drawings in each position of the wind deflector, the raising lever 25 extends in a rearward and upward direction. Thus, the wind deflector 3 is brought into the fully raised position shown in FIG. 3, at a point between the positions shown in FIGS. 2 and 3.

By pivoting the wind deflector 3 around a pivot axis located in the area of its front edge 20, the edge 20 remains in engagement with a sealing means 31 surrounding the edge of the opening 2 in the roof. As a result, disturbing air whirls and connected noises are avoided also in this area.

As shown in diagram form in the figures, the cover 4, at its front edge, has a step-like notch 33, while the wind deflector 3, in the area of its rear edge, is provided with a complementary step-like notch 34. The notch arrangement is made in such a way that the notch 34 of the wind deflector 3 overlaps the notch 33 at the front edge of the cover 4 in all of the positions between the closed position of the cover (FIG. 1) and the ventilating position (FIG. 2), including these positions. As a result, formation of a gap between the cover 4 and the wind deflector 3 is avoided in these positions and also when, because of tolerances the front end of the cover 4 and the rear end of the wind deflector 3 are somewhat staggered with respect to one another in the longitudinal direction. In addition, the rear edge of the wind deflector 3 acts as a holddown means for the front edge of the cover 4. This is especially important in the closed position of the cover (FIG. 1). A tight closing of the cover is insured also when, during high speed driving, forces affecting the cover 4 try to lift the cover in the area of its front edge.

Naturally, the raising movement of the wind deflector 3 may also be produced in manners other than the one shown as an example. In addition, it is basically also possible to push the cover 4 to the rear, starting from the ventilating position according to FIG. 2, not above, but under the fixed part 1 of the roof, after the cover had been initially lowered correspondingly.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A vehicle roof having a cover which is mounted and arranged for being rearwardly slidable from a closed position into an open position along guide rails extending on longitudinally opposite sides of a roof opening, as well as having a wind deflector forming a part of the roof located in front of the cover that is mounted and arranged for being automatically raised and lowered as a function of the position of the cover, said wind deflector and cover closing the roof opening and being pivotable about an axis extending transversely relative to the sliding direction of the cover, wherein the cover is also mounted and arranged for being tilted out into a ventilating position in conjunction with said wind deflector in a manner whereby the cover and wind deflector together effectively form a single panel arrangement, the wind deflector being at least partially raised along with the tilting of the cover.

2. A vehicle roof according to claim 1, wherein transport carriages are provided which are slidable along the guide rails and are connected with the cover via link guides which, by a limited shifting of the transport carriages with respect to the cover in the longitudinal direction of the guide rails, produce the tilting-out of the cover.

3. A vehicle roof according to claim 2, wherein each of the link guides has a pair of link slots that are staggered with respect to one another in the longitudinal direction of the guide rails and two link pins, each of which engage in one of the link slots.

4. A vehicle roof according to claim 3, wherein the link slots are sloped in such a way that the cover when it is tilted out, carries out a pivotal movement around a transverse axis which essentially coincides with a front edge of the wind deflector.

5. A vehicle roof according to claim 2, wherein the transport carriages each have at least one link pin which engages into a link slot of a cover carrier extending in the longitudinal direction of the cover.

6. A vehicle roof according to claim 4, wherein carriages for raising the wind deflector are provided which are slidable along the guide rails and are connected with the wind deflector via link guide means which, by means of limited shifting of the wind deflector carriages in the longitudinal direction of the guide rails with respect to the wind deflector, produce the raising of the wind deflector.

7. A vehicle roof according to claim 6, wherein each of the link guide means has a link slot formed in a wind deflector carrier and a link pin engaging in said link slot, said link pin, via a raising lever, being connected with a respective wind deflector carriage.

8. A vehicle roof according to claim 7, wherein the raising lever, in each position of the wind deflector, extends in a rearward and upward direction.

9. A vehicle roof according to claim 7, wherein the link slot of the link guide means is sloped in such a way that the wind deflector, as it is raised, carries out a pivotal movement around a transverse axis which essentially coincides with the front edge of the wind deflector.

10. A vehicle roof according to claim 6, wherein the wind deflector carriages are resiliently biased toward the rear for producing a limited movement following said shifting of the transport carriages, and the wind deflector carriages being directly shiftable toward the front by the transport carriages.

11. A vehicle roof according to claim 10, wherein, in the positions of the cover between the closed position and the ventilating position a rear area of the wind deflector forms a hold-down means for the front end of the cover.

12. A vehicle roof according to claim 11, wherein, in the positions of the cover between the closed position and the ventilating position, the rear edge of the wind deflector overlaps the front edge of the cover.

13. A vehicle roof according to claim 1, wherein, in the positions of the cover between the closed position and the ventilating position a rear area of the wind deflector forms a hold-down means for the front end of the cover.

14. A vehicle roof according to claim 13, wherein in the positions of the cover between the closed position and the ventilating position, the rear edge of the wind deflector overlaps the front edge of the cover.

15. A vehicle roof according to claim 1, wherein carriages for raising the wind deflector are provided which are slidable along the guide rails and are connected with the wind deflector via link guide means which, by means of limited shifting of the wind deflector carriages in the longitudinal direction of the guide rails with respect to the wind deflector, produce the raising of the wind deflector.

16. A vehicle roof according to claim 15, wherein each of the link guide means has a link slot formed in a wind deflector carrier and a link pin engaging in said link slot, said link pin, via a raising lever, being connected with a respective wind deflector carriage.

17. A vehicle roof according to claim 16, wherein the link slot of the link guide means is sloped in such a way that the wind deflector, as it is raised, carries out a pivotal movement around a transverse axis which essentially coincides with a front edge of the wind deflector.

18. A vehicle roof according to claim 15, wherein the wind deflector carriages are resiliently biased toward the rear for producing movement following said shifting of the transport carriages, the wind deflector carriages being directly shiftable toward the front by the transport carriages.

19. A vehicle roof according to claim 15, wherein, in the positions of the cover between the closed position and the ventilating position a rear area of the wind deflector forms a hold-down means for the front end of the cover.

20. A vehicle roof according to claim 19, wherein, in the positions of the cover between the closed position and the ventilating position, a rear edge of the wind deflector overlaps a front edge of the cover.

* * * * *